United States Patent
Kanaris

(10) Patent No.: US 9,284,131 B2
(45) Date of Patent: Mar. 15, 2016

(54) CONVEYOR DRIVE ROLLER WITH COOLING MEANS

(71) Applicant: Van der Graaf Inc., Brampton (CA)

(72) Inventor: Alexander D. Kanaris, Brampton (CA)

(73) Assignee: Van Der Graaf, Inc., Brampton, Ontario (CA)

( * ) Notice: Subject to any disclaimer, the term of this patent is extended or adjusted under 35 U.S.C. 154(b) by 20 days.

(21) Appl. No.: 14/304,320

(22) Filed: Jun. 13, 2014

(65) Prior Publication Data

US 2015/0360879 A1 Dec. 17, 2015

(30) Foreign Application Priority Data

Jun. 12, 2014 (CA) ..................................... 2854299

(51) Int. Cl.
| | |
|---|---|
| *B65G 13/06* | (2006.01) |
| *B65G 45/04* | (2006.01) |
| *B65G 39/02* | (2006.01) |
| *B65G 13/08* | (2006.01) |

(52) U.S. Cl.
CPC ............... *B65G 45/04* (2013.01); *B65G 13/08* (2013.01); *B65G 39/02* (2013.01); *Y10T 29/49465* (2015.01)

(58) Field of Classification Search
CPC ........ B65G 23/04; B65G 23/08; B65G 23/10; H02K 9/08
USPC .......................................... 198/788, 789, 791
See application file for complete search history.

(56) References Cited

U.S. PATENT DOCUMENTS

| | | | |
|---|---|---|---|
| 1,725,740 A | 8/1929 | Schulte | |
| 2,915,167 A * | 12/1959 | Berger | B65G 23/08 198/788 |
| 3,188,833 A | 6/1965 | Robinson | |
| 4,728,840 A | 3/1988 | Newhouse | |
| 5,088,596 A | 2/1992 | Agnoff | |
| 5,934,447 A | 8/1999 | Kanaris | |
| 6,125,993 A * | 10/2000 | Hansson | B65G 23/08 198/788 |
| 6,250,376 B1 | 6/2001 | Hendrix | |
| 6,523,775 B2 | 2/2003 | Fan | |
| 6,683,284 B2 | 1/2004 | Nyman et al. | |
| 6,766,900 B2 | 7/2004 | Kanaris | |
| 6,837,364 B2 | 1/2005 | Kanaris | |
| 6,938,754 B2 | 9/2005 | Kanaris | |

(Continued)

OTHER PUBLICATIONS

"Cool Line Oil Cooler, AC Motor, 18.1HP Heat Removed", Grainger, httyp://www.grainger.com/Grainger/COOLLINE-Forced-Air-Oil-Cool, printed Jul. 30, 2012, 1 page.

(Continued)

Primary Examiner — James R Bidwell
(74) Attorney, Agent, or Firm — Boyle Fredrickson, S.C.

(57) ABSTRACT

A conveyor drive roller for moving a conveyor medium. The conveyor roller has a hollow drum which is rotatably connected to a first and a second stationary shaft. An internal gear assembly is disposed inside the hollow drum and couples a motor to the hollow drum such that operation of the motor causes rotation of the hollow drum about the first and second stationary shafts. The hollow drum is configured to hold a liquid lubricant in contact with the internal gear assembly. Liquid lubricant flow paths are provided to move the liquid lubricant from inside the hollow drum to outside the hollow drum via the first or second stationary shafts, and vice versa. The liquid lubricant flow paths are configured for connection to a means for cooling the liquid lubricant.

42 Claims, 6 Drawing Sheets

(56) References Cited

U.S. PATENT DOCUMENTS

| | | |
|---|---|---|
| 7,097,605 B2 | 8/2006 | Zaoralek |
| 7,204,359 B2 | 4/2007 | Kanaris |
| 7,228,952 B2 | 6/2007 | Kanaris |
| 7,244,205 B2 | 7/2007 | Kanaris |
| 7,329,215 B2 | 2/2008 | Umeda |
| 7,362,016 B2 | 4/2008 | Cheng |
| 7,510,073 B2 | 3/2009 | Kanaris |
| 7,543,700 B2 | 6/2009 | Simke et al. |
| 7,753,193 B2 | 7/2010 | Kanaris |
| 7,806,252 B2 | 10/2010 | Kanaris |
| 7,870,949 B2 | 1/2011 | Kanaris |
| 8,292,064 B2 | 10/2012 | Kanaris |
| RE44,907 E | 5/2014 | Kanaris |
| RE44,919 E | 6/2014 | Kanaris |

OTHER PUBLICATIONS

"Global Standard Cooler—Cool-Line AP", AKG Thermal Systems, Inc. 809 Mattress Factory Road, P.O. Box 189, Mebane, NC 27302-0189, 2008, 6 pages.

* cited by examiner

CONVEYOR DRIVE ROLLER WITH COOLING MEANS

FIELD OF THE INVENTION

The present invention relates generally to conveyor roller systems for conveying or moving objects from one place to another. Conveyor systems generally employ a series of rollers on which a continuous belt or other conveyor medium travels. Some of the rollers in such a system act as drive rollers, and are rotated to move the continuous belt. The present invention relates, in particular, to conveyor drive rollers with internal gear assemblies and/or motors, for use in such conveyor belt systems.

BACKGROUND OF THE INVENTION

A variety of conveyor roller systems have been designed and utilized. A large variety of known conveyor systems comprise a continuous belt or conveyor medium which travels over a series of conveyor rollers.

Early conveyor roller systems utilized at least one conveyor drive roller which was driven by an electric motor positioned outside of, and connected to, the conveyor drive roller typically via a chain or rubber belt, and often with an external gear assembly positioned between the motor and the conveyor roller. The conveyor drive roller thereby translated the rotational movement of the electric motor to linear movement of the conveyor medium. The main disadvantage of these early designs, which are still utilized today, is that they take up a lot of space. However, the exposed moving parts also pose a hazard to workers, especially the external gear assembly and chain from the external gear assembly to the conveyor roller, which output high levels of torque, as compared to the motor on its own. The exposed moving parts also pick up debris which damages the conveyor roller system.

In later conveyor roller systems, the electric motor was arranged within the conveyor drive roller to provide a more compact conveyor roller system as taught, for example, in U.S. Pat. No. 1,725,740, to Schulte. One problem with these types of prior motorized conveyor drive rollers is that the internal motor generates heat which is confined to a small space inside the roller tube or cylinder. The heat is generated as a function of the current flowing through the electric motor windings. Thus larger electric motors required to provide more powerful conveyor drive rollers typically generate more heat. If the heat is not adequately dissipated or controlled, it will lead to overheating. Overheating is the most common failure mechanism for an electric motor, and can lead to a) failure of the winding-isolation, which results in a short-circuit and possibly burnout of the motor, b) failure of the bearings, resulting in a jammed motor, and degradation of the magnets, leading to reduced performance. Overheating can also cause damage to the internal parts of the conveyor drive roller. Either failure mode leads to costly repairs and down time.

Accordingly, in the context of motors and motor only conveyor drive rollers there have been developments for cooling the motor windings, as disclosed in for example, U.S. Pat. Nos. 3,188,833, 4,728,840, 7,329,215, 7,362,016, and 7,543,700.

U.S. Pat. Nos. 5,088,596 and 7,510,073, represent examples of even more advanced conveyor drive rollers, which include an internal electric motor and gear assembly for engaging and rotating the roller tube or cylinder. Conveyor roller systems having conveyor drive rollers which are driven by motor and gear combinations, contained entirely within the conveyor drive roller itself, are of particular utility in many applications. One of the benefits of these types of conveyor drive rollers is that for a given power rating, the internal gear assembly permits use of a smaller electric motor, which results in less heat generation as compared to a similarly sized and power rated motor only conveyor drive roller. The use of an internal lubricant also assists with heat dispersal and dissipation. However, the internal motor and gear assembly system also makes for a compact, space saving installation. Furthermore, the linear arrangement of the motor and gear assembly within the conveyor drive roller means that the transmission of power from the motor to the roller is carried out more directly resulting in higher levels of efficiency than is possible in conventional conveyor roller systems where the motor is positioned externally to the conveyor drive roller, especially where the axis of rotation of the rotor is at a 90° angle to the axis of rotation of the roller. The internal motor and gear assembly combination also largely eliminates the risk of accident caused by contact with employees. Furthermore, it eliminates contamination of the motor/gear drive from dust and debris in the environment in which it is running, thereby greatly reducing maintenance, and the likelihood of failure, all of which results in less down time for the conveyor system. All of these factors make the use of such conveyor drive rollers particularly useful and desirable.

U.S. Pat. Nos. 7,806,252 and 8,292,064 represent an example of another conveyor drive roller, which includes an external electric motor with means to connect to an internal gear assembly for engaging and rotating the roller tube or cylinder. This latter example addresses a need for a conveyor having the benefits of internal gearing while providing an easily replaceable external motor to minimize cost and down time in the event of a failure of the electric motor.

However, a problem has been discovered with conveyor drive rollers with an internal gear assembly in that as the size of the conveyor drive roller is scaled up the heat generated increases to the point that the internal liquid lubricant begins to degrade and lose its viscosity, which can lead to premature failure. In such geared conveyor drive rollers the majority of the heat is generated by the rolling/scraping action of the gear assembly, and not the electric motor.

Other prior art patents of general interest in the field of conveyor roller devices include U.S. Pat. Nos. 6,250,376, 6,523,775, 6,683,284, and 7,097,605.

Therefore, there is a continuing need for improvement in the design of motorized conveyor drive rollers.

SUMMARY OF THE INVENTION

What is desired is an improved conveyor drive roller having cooling means to permit an operating temperature which is below a temperature at which conventional liquid lubricants, such as oils, degrade, or lose their rated viscosity, or components of the conveyor drive roller 10 fail, causing damage to the conveyor drive roller 10.

According to the preferred embodiment of the present invention, there is provided a conveyor drive roller for moving a conveyor medium. The conveyor roller has a hollow drum which is rotatably connected to a first and a second stationary shaft. An internal gear assembly is disposed inside the hollow drum and couples a motor to the hollow drum such that operation of the motor causes rotation of the hollow drum about the first and second stationary shafts. The hollow drum is configured to hold a liquid lubricant, such as oil, in contact with the internal gear assembly. Liquid lubricant flow paths are provided to move the liquid lubricant from inside the hollow drum to outside the hollow drum via the first or second stationary shafts, and vice versa. The liquid lubricant flow paths are connectable to a means for cooling the liquid lubricant.

Accordingly, there is provided in accordance with one aspect of the present invention a conveyor drive roller for moving a conveyor medium, said conveyor drive roller comprising:

a hollow drum rotatably connected to a first stationary shaft and a second stationary shaft;

an internal gear assembly disposed inside said hollow drum, and operatively connected to said hollow drum, said internal gear assembly being configured to operatively couple to a motor, wherein when said motor is coupled to said internal gear assembly, operation of said motor causes rotation of said hollow drum about said first and second stationary shafts;

a first liquid lubricant flow path passing from inside said hollow drum to outside said hollow drum through said first or second stationary shaft, said first liquid lubricant flow path being configured to permit a liquid lubricant be moved from inside said hollow drum to outside said hollow drum; and a second liquid lubricant flow path passing from outside said hollow drum to inside said hollow drum through said first or second stationary shaft, said second liquid lubricant flow path being configured to permit said liquid lubricant be moved from outside said hollow drum to inside said hollow drum; and wherein said first and second liquid lubricant flow paths are configured to connect to a means for cooling said liquid lubricant positioned outside of said hollow drum.

According to another aspect of the present invention, there is provided a method of cooling a conveyor drive roller having a) a hollow drum rotatably connected to a first stationary shaft and a second stationary shaft, b) an internal gear assembly disposed inside said hollow drum, and operatively connected to said hollow drum, said internal gear assembly being configured to operatively couple to a motor, wherein when said motor is coupled to said internal gear assembly operation of said motor causes rotation of said hollow drum about said first and second stationary shafts, and c) a liquid lubricant disposed inside said hollow drum, said method comprising the step of:

circulating said liquid lubricant inside of said hollow drum through a means for cooling said liquid lubricant positioned outside of said hollow drum.

According to another aspect of the present invention, there is provided a method of making a conveyor drive roller in a size smaller than required to avoid overheating by intrinsic heat dissipation during continuous operation of said conveyor drive roller, the method comprising the steps of:

forming a hollow drum with said smaller size and rotatably connecting said hollow drum to a first stationary shaft and a second stationary shaft, with an internal gear assembly disposed inside of said hollow drum and operatively connected to said hollow drum, said hollow drum being configured to hold a liquid lubricant in contact with said internal gear assembly, said internal gear assembly being configured to operatively couple to a motor, wherein when said motor is coupled to said internal gear assembly operation of said motor causes rotation of said hollow drum about said first and second stationary shafts; and configuring said first and/or second stationary shaft to permit circulation of said liquid lubricant inside of said hollow drum through a means for cooling said liquid lubricant, wherein said means for cooling said liquid lubricant is capable of cooling said liquid lubricant circulated therethrough to maintain a temperature of the liquid lubricant inside of said hollow drum below a critical temperature.

BRIEF DESCRIPTION OF THE DRAWINGS

Reference will now be made to the preferred embodiments of the present invention with reference, by way of example only, to the following drawings in which:

FIG. 6 is a graph of oil temperature vs. time showing a decrease in the temperature of oil in the conveyor drive roller of FIG. 1 after the oil cooling means is turned on.

DETAILED DESCRIPTION OF THE PREFERRED EMBODIMENTS

The present invention is described in more detail with reference to exemplary embodiments thereof as shown in the appended drawing. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
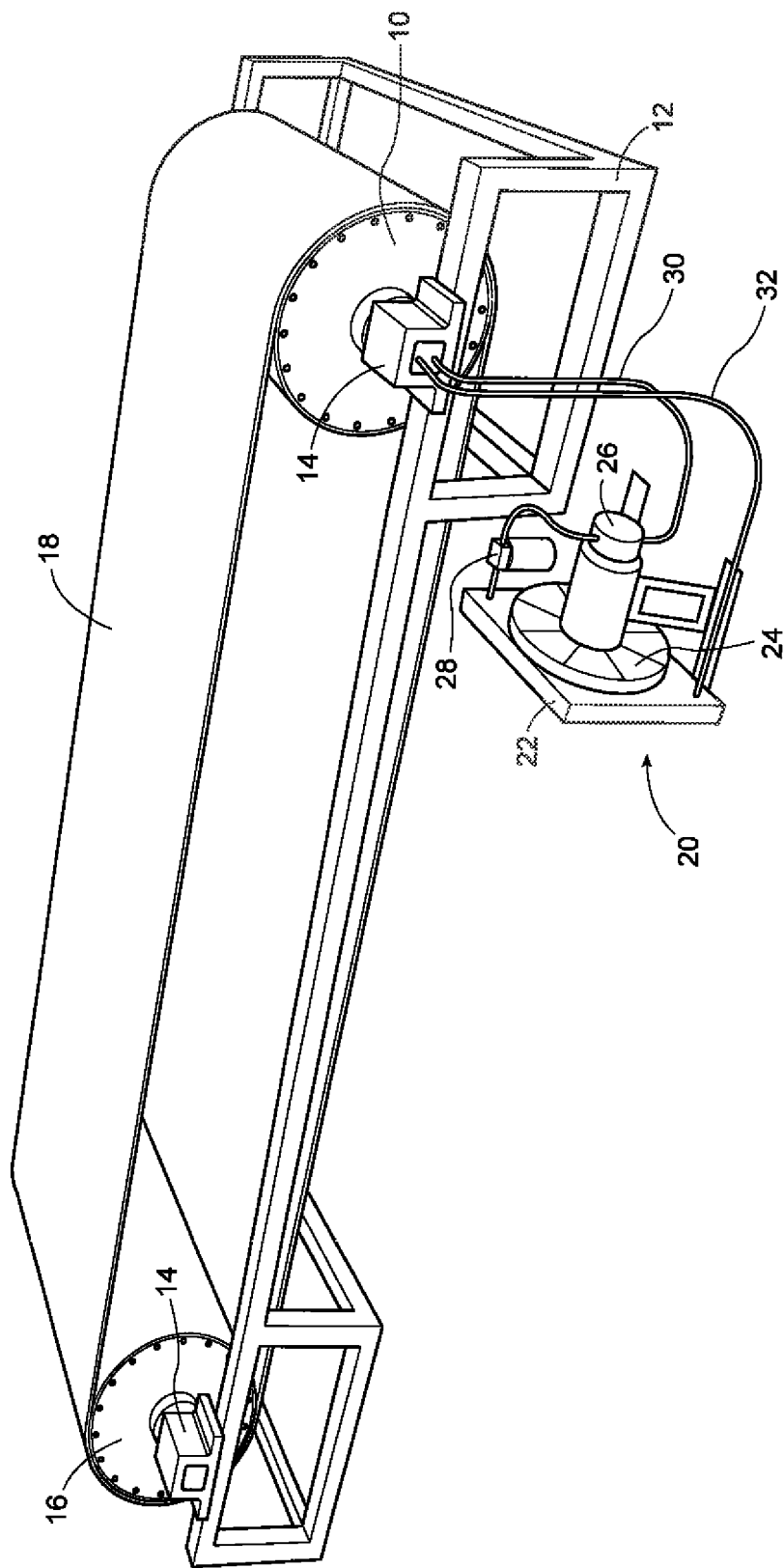
FIG. 1 is a diagram of a conveyor drive roller according to an embodiment of the present invention installed in a conveyor system.

A conveyor drive roller 10 according to an embodiment of the present invention is shown in FIG. 1. The conveyor drive roller 10 is attached to one end of a frame 12 by a shaft holder or the like, such as for example, a pair of blocks or clamps 14, one on each side of the frame 12. A free spinning conveyor idler roller 16 is mounted to the other end of the frame 12 also by a pair of blocks or clamps 14, one on each side of the frame 12. A conveyor medium 18, such as an endless belt of webbing is carried by the conveyor drive roller 10 and conveyor idler roller 16. As described in more detail below an oil cooling means 20, which consists of a radiator 22, a fan unit 24, an oil pump 26, and optionally a filter 28 is operatively connected to the conveyor drive roller 10 via an oil removal line 30 and an oil return line 32.

Figure 2:
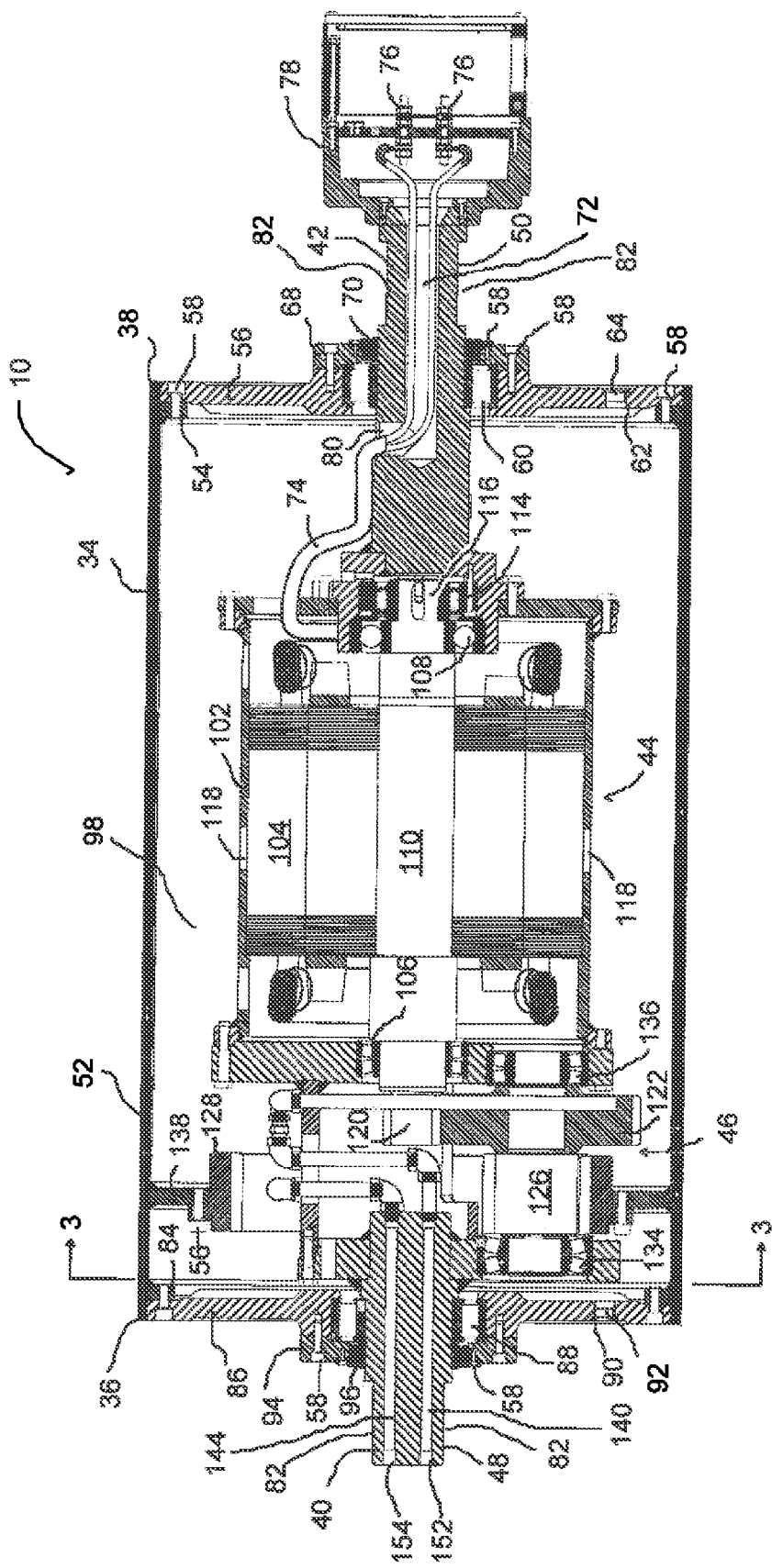
FIG. 2 is a cross-sectional view of the conveyor drive roller of FIG. 1.

Referring now to FIG. 2, the conveyor drive roller 10 consists of a hollow cylindrical drum 34, having ends 36 and 38. Stationary shafts 40 and 42 extend through respective ends 36, 38. One end of each of the stationary shafts 40 and 42 is disposed internally of the cylindrical drum 34 for carrying the drive means for rotating the cylindrical drum 34, which consists of an electric motor 44 coupled to a gear assembly 46, between the stationary shafts 40 and 42.

Figure 3:
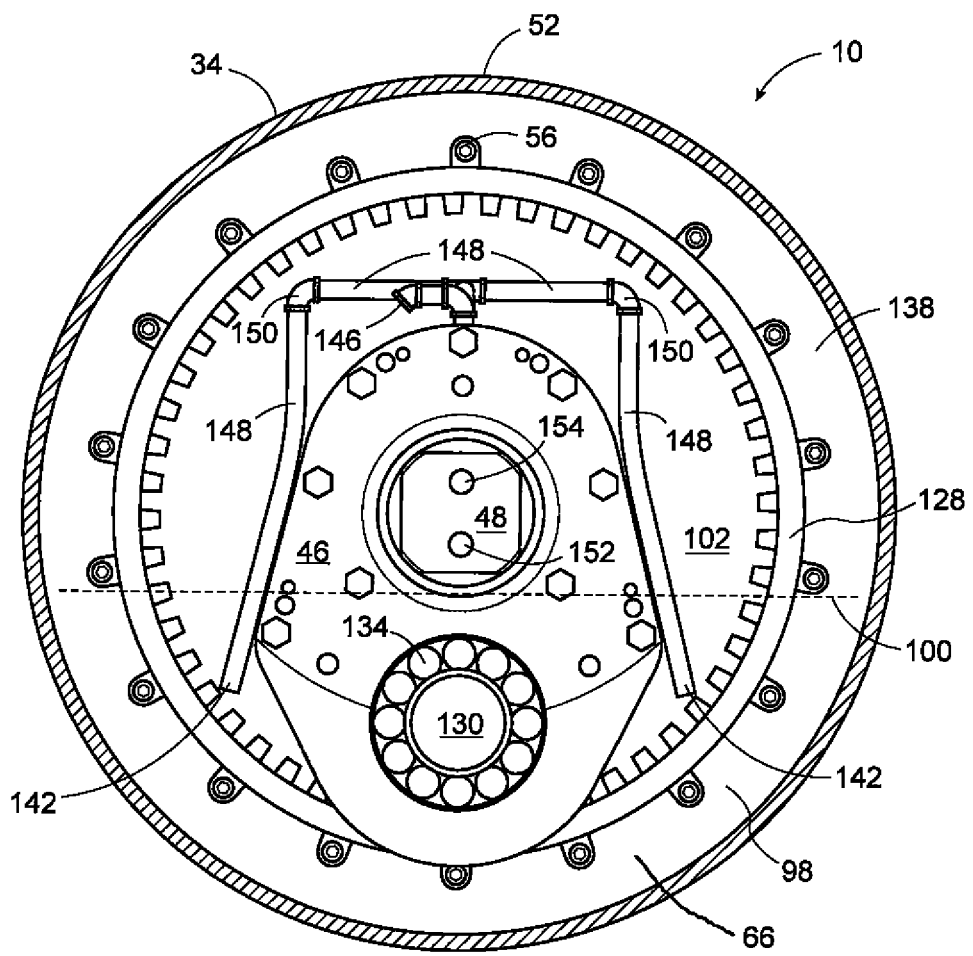
FIG. 3 is a cross-sectional view of the conveyor drive roller of FIG. 2 taken along line 2-2.
Figure 4:
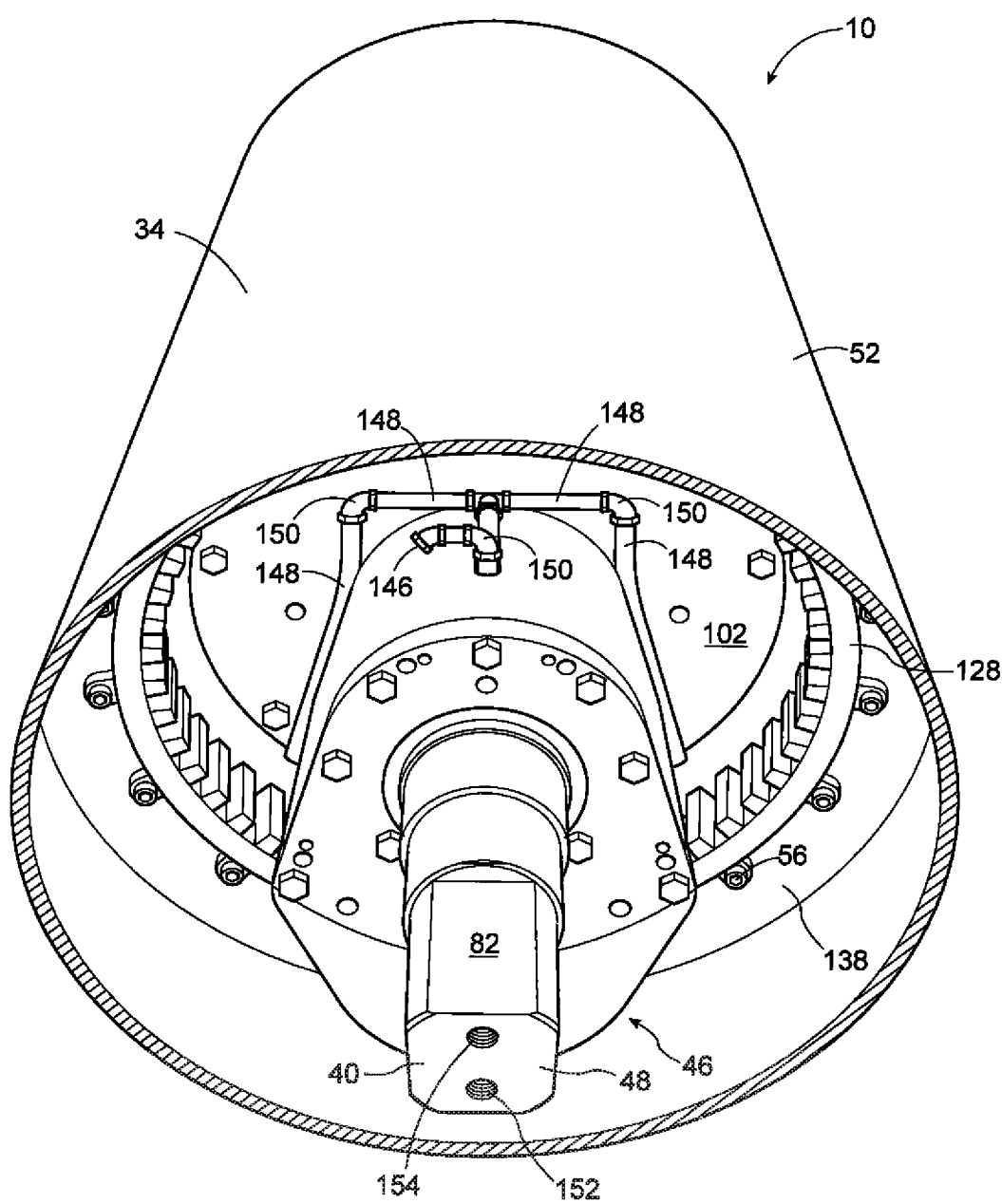
FIG. 4 is a perspective view of the internal components of the conveyor drive roller of FIG. 2.

The exterior portions 48 and 50 of respective stationary shafts 40 and 42 have cross-sections which permit them to be held by a shaft holder or the like that will register with the exterior portions of the stationary shafts 40 and 42 for positive securement. As best seen in FIGS. 3 and 4, the exterior portions 48, 50 of the stationary shafts 48 and 50 present a generally square cross-section so as to prevent rotation of the stationary shafts 40, 42. Accordingly, the exterior portions 48, 50 of the stationary shafts 40, 42 can be mounted on any suitable support or frame work, and secured on for example blocks or clamps 14 attached to frame 12 as shown in FIG. 1, all of which is known and requires no detailed description.

The conveyor medium 18 typically a belt or flexible strip of any suitable material, or a matrix of chain links, or the like runs around the outer surface 52 of the cylindrical drum 34 and is driven by the cylindrical drum 34, which rotates about stationary shafts 40, 42. Such a conveyor medium may also run over additional conveyor drive rollers 10 and conveyor idler rollers 16. Furthermore the outer surface 52 may include any variety of means to increase the co-efficient of friction between the outer surface 52 and the conveyor medium 18 such as for example by knurling or machining a spiral at each end toward the center or by covering the outer surface 52 with rubber or the like.

As shown in FIG. 2, a securing ring 54 is attached to the inside of the cylindrical drum 34, preferably by welding, or press fitting, at end 38. End flange 56 is sealingly secured to the securing ring 54 by fasteners 58, such as for example socket head caps as shown. Preferably a gasket (not shown), may be positioned between the securing ring 54 and the end flange 56. The end flange 56 is sized and shaped with a hole to accommodate ball bearing ring 60 about stationary shaft 42. Preferably, the end flange 56 may include an oil fill hole 62 and filler plug 64 as shown, which can be used to fill the inside of the cylindrical drum 34 with a liquid lubricant, such as oil 66, as discussed below. An end cap 68 is sealingly secured to the end flange 56 by fasteners 58 to hold the ball bearing ring 60 in place in the hole of the end flange 56. Preferably a gasket (not shown) may be positioned between the end flange 56 and the end cap 68. The end cap 68 is sized and shaped with a hole to accommodate an oil seal 70 about stationary shaft 42. By way of example, the oil seal 70 may be secured to the end cap 68 with fasteners 58. It will be appreciated that according to another embodiment of the present invention, the end flange 56 and end cap 68 may be formed as a unitary structure serving the same function as provided by the end flange 56 and end cap 68 separately. Preferably, stationary shaft 42 has a cable passage 72 for receiving an electrical cable 74 having one end electrically connected to the motor 44, and the other end electrically connected to electrical terminals 76 enclosed in an electrical housing 78, as shown. A sealing ring 80 is preferably used to seal the cable passage 72 around the electrical cable 74 inside of the cylindrical drum 34. What is important is that cylindrical drum 34 is rotatably connected to stationary shaft 42 at end 38, and adapted to pass electrical cable 74 from outside to inside of the cylindrical drum 34 for powering the motor 44. Stationary shaft 42 is preferably mountable on, and securable to, a suitable support or frame work, such as for example frame 12 shown in FIG. 1. For example, the exterior portion 50 of stationary shaft 42 may have two flat sections 82 at opposite sides, for locking in a block or clamp 14 on the frame 12.

Also shown in FIG. 2, a securing ring 84 is attached to the inside of cylindrical drum 34, preferably by welding, or press fitting, at end 36. End flange 86 is sealingly secured to the securing ring 84 by fasteners 58, such as for example socket head caps as shown. Preferably a gasket (not shown) may be positioned between the securing ring 84 and the end flange 86. The end flange 86 is sized and shaped with a hole to accommodate ball bearing ring 88 about stationary shaft 40. Preferably, the end flange 86 may include an oil fill hole 90 and filler plug 92 as shown, which can be used to fill the inside of the cylindrical drum 34 with oil 66 as discussed below. An end cap 94 is sealingly secured to the end flange 86 by fasteners 58. Preferably a gasket (not shown) may be positioned between the end flange 86 and the end cap 94. The end cap 94 is sized and shaped with a hole to accommodate oil seal 96 about stationary shaft 40. By way of example, the oil seal 96 may be secured to the end cap 94 with fasteners 58. It will be appreciated that according to another embodiment of the present invention, the end flange 86 and end cap 94 may be formed as a unitary structure serving the same function as provided by the end flange 86 and end cap 94 separately. What is important is that cylindrical drum 34 is rotatably connected to stationary shaft 40 at end 36. Stationary shaft 40 is preferably mountable on, and securable to, a suitable support or frame work, such as for example frame 12 shown in FIG. 1. For example, the exterior portion of stationary shaft 40 may have two flat sections 82 at opposite sides, for locking in a block or clamp 14 on the frame 12.

A compartment 98 containing the drive means for rotating the cylindrical drum 34 is formed between the end flanges 56 and 86. Preferably, the compartment 98 is partly filled with a liquid lubricant, such as oil 66, ensuring proper lubrication and cooling during operation of the conveyor drive roller 10. Examples of suitable liquid lubricants may include oils such as EP220, mineral or synthetic industrial enclosed gear box lubricants in accordance with AGMA 9005-D98/ISO 12925. It will be appreciated that viscosity of the liquid lubricant can be selected based factors such as the ambient temperature, the operating temperature, and the pitch line velocity of for example the lowest gear submerged in lubricant in the case of a conveyor drive roller 10 with an internal gear assembly 46. Oil 66 may be added to compartment 98 via oil fill holes 62, 90, preferably to the level indicated by line 100 in FIG. 3.

As mentioned above, the interior portions of the stationary shafts 40, 42 carry the drive means for rotating the cylindrical drum 34. According to the embodiment of the invention shown in FIG. 2, the drive means consists of a motor 44 coupled to a gear assembly 46. The interior portion of stationary shaft 40 is attached to one end of the gear assembly 46, preferably by welding or press fitting, while the interior portion of stationary shaft 42 is attached to one end of the motor 44, also preferably by welding or press fitting. The motor 44 includes a motor housing 102 securing a stator 104, and ball bearing rings 106, 108 which permit free rotation of the rotor 110, within the stator 112. The electrical cable 74 supplies electrical current through stationary brushes 114 in contact with the revolving commutator 116 on the rotor 110 as shown. The motor housing 102 preferably includes openings 118 to permit the oil 66 inside of the cylindrical drum 34 to move into and out of the motor housing 102 to lubricate and cool the motor 44.

The rotor 110 has a pinion 120, positioned at the end of the rotor opposite to the end with the revolving commutator 116, for rotational engagement with intermediate gear 122, which is press fit on to a second rotatable shaft 124 having a second pinion 126. The second pinion 126 is positioned for rotational engagement with internal ring gear 128. The ends of the second rotatable shaft 130, 132 are rotationally supported by ball bearing rings 134 and 136, respectively. The internal ring gear 128 is secured by fasteners 58, such as for example socket head caps, to a securing ring 138 which is attached to the interior of cylindrical drum 34, preferably by welding or press fitting. In the preferred embodiment of the present invention the hollow drum is a cylindrical drum 34, however it will be understood that the present invention is not limited to a cylindrical drum 34. It is contemplated that if the hollow drum is non-cylindrical, the internal ring gear 128, will need to be mounted with a securing ring 138 which is suitably modified to attach to the non-cylindrical drum.

As can now be understood, the teeth of the pinion 120 of rotor 110 mesh with the teeth of the intermediate gear 122 so that rotation of the rotor 110 causes rotation of the second pinion 126. Since the teeth of the second pinion 126 mesh with the teeth of the internal ring gear 128, which is attached to the inside of the cylindrical drum 34, rotation of the rotor 110 ultimately causes rotation of the cylindrical drum 34.

In a preferred embodiment of the present invention the gear assembly 46 is configured to reduce the rate of rotational movement of the cylindrical drum 34 relative to the rate of rotational movement of the rotor 110 of the motor 44. However, it will be appreciated that the gear assembly 46 may be configured to also increase the rotational movement of the cylindrical drum 34 relative to the rotational movement of the rotor 110 of motor 44. The use of gears and gear ratios to be used, will be understood by those skilled in the art and therefore requires no detailed description.

While a preferred embodiment of the present invention is described above with respect to a motor 44 coupled to a gear assembly 46, which is positioned inside of the cylindrical drum 34, the present invention is not limited to such a configuration. For example, it will be appreciated that according to another embodiment of the present invention, while gear assembly may be provided inside of the cylindrical drum 34, the motor may be provided outside of the cylindrical drum 34, and connected to the internal gear assembly with an appropriate coupling. Such a configuration may generate heat caused by friction acting on the moving parts of the internal gear assembly, and so may benefit from the method for cooling the oil 66 inside the cylindrical drum 34 according to the present invention. Similarly, according to another embodiment of the present invention, the gear assembly 46 may be omitted altogether and the speed of rotation of the cylindrical drum 34 governed by the motor 44 itself. Such a configuration may also generate heat by friction acting on the moving parts of the motor 44, as well as current flowing through the electric motor windings, and so may also benefit from the method for cooling the oil 66 inside the cylindrical drum 34 according to the present invention. All such embodiments of the present invention are comprehended by the present invention.

With reference to FIGS. 2 to 5, an oil removal flow path is shown for drawing oil 66 from inside compartment 98 of the cylindrical drum 34 to outside of the cylindrical drum 34 for circulation through the oil cooling means 20. In the embodiment of the present invention shown in FIGS. 2 to 5, the oil removal flow path is defined by a series of pipes 148 and elbows 150 connected to an oil removal conduit 140 provided in stationary shaft 40. Portions of the oil removal flow path are shown secured to the gear assembly 46 inside compartment 98. In the example shown, the oil removal flow path defines a pair of inlets 142. However, it will be appreciated that the oil removal flow path may take other forms, be made with more or fewer parts, and define more or fewer inlets 142. All such forms are comprehended by the present invention. What is important is that the oil removal flow path has an inlet 142 which is below a level of the oil 66 when the conveyor drive roller 10 is installed in the frame 12, as indicated by oil level line 100, and is configured to permit oil 66 from compartment 98 to be moved to outside of the conveyor drive roller 10. Similarly, an oil return flow path is shown for moving oil 66 from outside of the conveyor drive roller 10 to inside compartment 98 of the cylindrical drum 34, for returning the oil 66 circulated through the oil cooling means 20. In the embodiment of the present invention shown in FIGS. 2 to 5, the oil return flow path is defined by a series of pipes 148 and elbows 150 connected to an oil return conduit 144 provided in stationary shaft 40. Portions of the oil return flow path are shown secured to the gear assembly 46 inside compartment 98. In the embodiment shown the oil return flow path defines a single outlet 146. However, it will be appreciated that the oil return flow path may take other forms, be made with more or fewer parts, and define more or fewer outlets 146. All such forms are comprehended by the present invention. What is important is that the oil return flow path has an outlet 146 which is positioned inside compartment 98. Preferably, the outlet 146 is positioned above the gear assembly 46 when the conveyor drive roller 10 is installed in the frame 12.

According to a preferred embodiment of the present invention, the series of pipes 148 and elbows 150 making up the oil removal path and the oil return path are ½ inch hydraulic grade NPT. Additionally, the oil removal conduit 140 and the oil return conduit 144, best seen in FIG. 2, are each preferably formed by drilling through the stationary shaft 40 to a diameter of 18 mm (or 23/32 inches) and tapping ½-14 NPT 13.5 mm deep full threads at both ends. What is important is that the oil removal and return paths are sized to permit an adequate flow rate of the oil 66 therethrough. It will be appreciated that the size and shape of the oil removal conduit 140 and the oil return conduit 144 in the stationary shaft 40 may be selected based on a desire to maintain adequate structural integrity of the stationary shaft 40.

Referring back to FIG. 1, the outlet 152 of the oil removal conduit 140 on the stationary shaft 40 is connected to oil removal line 30 of oil cooling means 20. Similarly, the inlet 154 of the oil return conduit 144 is connected to oil return line 32 of the oil cooling means 20. Preferably these connections are configured as reversible connections to permit connection and disconnection of the oil cooling means 20 to and from the conveyor drive roller 10 as desired, as will be appreciated by persons skilled in the art. Preferably, the oil cooling means 20 is configured to a) circulate the oil 66 into and out of the compartment 98 via the inlet 142, the oil removal path, the oil removal line 30, the oil return line 32, the oil return path, and the outlet 146, and b) cool the oil 66 as it circulates through the oil cooling means 20. By way of example, the oil cooling means 20 may be a forced air oil cooler, such as for example, a COOL-LINE™ oil cooler manufactured by AKG Thermal Systems, Inc. (Mebane, N.C., U.S.A) Model # AP30-2041, available from Acklands-Grainger, Inc. (Richmond Hill, Ontario), under Grainger Item #6PKU2. The COOL-LINE™ AP30-2041 oil cooler is a forced air oil cooler consisting of a heat exchanger/radiator 22, a fan unit 24, an oil pump 26, and a filter 28, having the following technical specifications:

Type: AC Motor With Pump
HP Heat Removed: 18.1
Filter Type: Spin-On
Microns: 9
Displacement: 1.22 cu.-in.
Pump Type: Low-Pressure Gerotor, Fixed Displacement, Self-Priming
Pump RPM: 1750
GPM @ 1750 RPM: 8.9
Voltage: 230/460
Motor Amps: Fan/Pump—8.6/4.3
Motor HP: Fan/Pump—3
Inlet Port Size: Code 61, 1½" Flange
Outlet Port Size: SAE #16
Decibels: 85
Fluids: Mineral Oil to DIN 51524 Part 2
Max. Pressure With Pump: 225 PSI (15 BAR)
Pump Rated Suction Pressure: 0.7 to 2.0 BAR
Ambient Temperature W/Pump: −20 to 80° C.

Max. Oil Temperature W/Pump: 80° C. (176° F.)
Viscosity: 10 to 2,000 centistoke.
Motor Housing Material: Steel
Pump Material: Steel/Aluminum
Heat Exchanger Material: Aluminum
Fan Guard Material: Steel
Fan Blade Material: Polypropylene
Finish: Black
Overall Height: 23.4"
Overall Width: 27.6"
Overall Depth: 24"

However, the oil cooling means 20 of the present invention is not limited to the above forced air oil cooler manufactured by AKG Thermal Systems, Inc. What is important is that the oil cooling means 20 be configurable to circulate the oil 66 from the compartment 98 inside of the conveyor drive roller 10 and cool the oil 66 as it passes therethrough. Preferred embodiments of the oil cooling means 20 include a pump 26, a heat exchanger, such as a radiator 22, an oil removal line 30, and an oil return line 32 connecting to respective oil return conduit inlet 154 and oil removal conduit outlet 152 on the stationary shaft 40. Examples of other heat exchangers include liquid to liquid heat exchangers similar to marine oil coolers used on marine engines. Moreover, it is contemplated that a sufficiently sized oil removal line 30 or oil return line 32 may itself serve as a heat exchanger.

Preferably, the oil cooling means 20 will be sized and configured to be capable of reducing the temperature of the oil 66 in the conveyor drive roller 10 by 20° C. to 60° C., most preferably 40° C. to 50° C. However, it will be appreciated that the desired level of cooling will depend on the specific application, and so the preferred oil cooling means 20 will need to be sized and configured to address the desired level of cooling. Preferably, the oil cooling means 20 will be selected in part based on the amount of the heat generated by, and rejected by, the conveyor drive roller 10 during operation.

The heat generated by the conveyor drive roller 10 may be estimated by calculating the losses that takes place at each component such as for example friction losses in gear assembly 46 (i.e. loading of gear assembly), energy conversion losses in motor 44 (i.e. current density and magnetic density), and friction losses in ball bearing rings 60, 88, 106, 108, 134, and 136, and oil seals 70 and 96. For example, the 200 horsepower conveyor drive roller 20 according to the present invention has an estimated heat generation rate of 27 hp based on an 86.5% efficiency factor (i.e. 13.5% calculated losses in the gear assembly 46, motor 44, ball bearing rings 60, 88, 106, 108, 134, and 136, and oil seals 70 and 96). Similarly, the heat rejected by the conveyor drive roller 10 to the conveyor medium and the surrounding environment may be estimated by for example calculating the surface area of the conveyor drive roller 10 and multiplying the resulting value by a factor of 2 watts/inch$^2$ of roller surface area. According to this example, a 200 hp conveyor drive roller 10 having a width of 66.93 inches and a diameter of 31.5 inches will have a roller surface area of 8,182.02 inch$^2$ (i.e. $2\pi$(radius)(width)+$2\pi$(radius)$^2$), which, multiplied by 2 watts/inch$^2$ results in an estimated heat rejection rate of about 16,364.05 watts (i.e. 21.94 hp). Other methods for estimating the heat generated by and rejected by the conveyor drive roller 10 will be known to persons skilled in the art. All such methods for estimating the heat generated by and rejected by the conveyor drive roller 10 are comprehended by the present invention.

Preferably, the oil cooling means 20 will be capable of circulating all of the oil 66 in the cylindrical drum 34 every 1.5 to 2 minutes, and have a heat rejection rate at least equal to the difference between the estimated heat generation rate and the estimated heat rejection rate of the conveyor drive roller 10. For example, if the difference between the estimated heat generation rate and heat rejection rate of a conveyor drive roller 10 according to an embodiment of the present invention is 5.06 hp (i.e. 27 hp-21.94 hp) then the cooling means 20 should preferably be sized and configured to provide a heat rejection rate of at least 5.06 hp.

A thermostat device (not shown) may be operatively connected to the conveyor drive roller 10 to measure the temperature of the oil 66 inside the conveyor drive roller 10, and to activate the oil cooling means 20 when a predetermined oil temperature is exceeded (i.e. 90° C.), and to turn off the oil cooling means 20 when the oil temperature drops below a certain predetermined temperature, thereby maintaining a predetermined oil temperature of the oil 66 inside the conveyor drive roller 10.

Example 1

Oil Cooling Test

The following describes a test of a 200 horsepower conveyor drive roller 10 connected to an oil cooling means 20 in accordance with an embodiment of the present invention. The conveyor drive roller 10 used in this test had the following specifications:
width: 66.93 inches
diameter: 31.5 inches;
horse power of motor: 200 hp at 1750 RPM
gear reduction: two stages parallel shafts coaxial (total ratio i=19.94)

For this test, the conveyor drive roller was not rigged to a conveyor system, or operated to move a conveyor medium.

The oil cooling means 20 used was a HYDAC® ELD3H3.512S1BP3 air cooled oil cooler, available from HYDAC Corporation, Welland, Ontario, which had a maximum heat rejection rate of 15 hp (38,207 BTU/hr), and the following additional specifications:
Max. Continuous Pressure: 230 PSI
Max. Continuous Flow: 40 GPM
Max. Oil Temperature: 130° C. (266° F.)
Max. Oil Viscosity: 2,000 centistoke.

Figure 5:
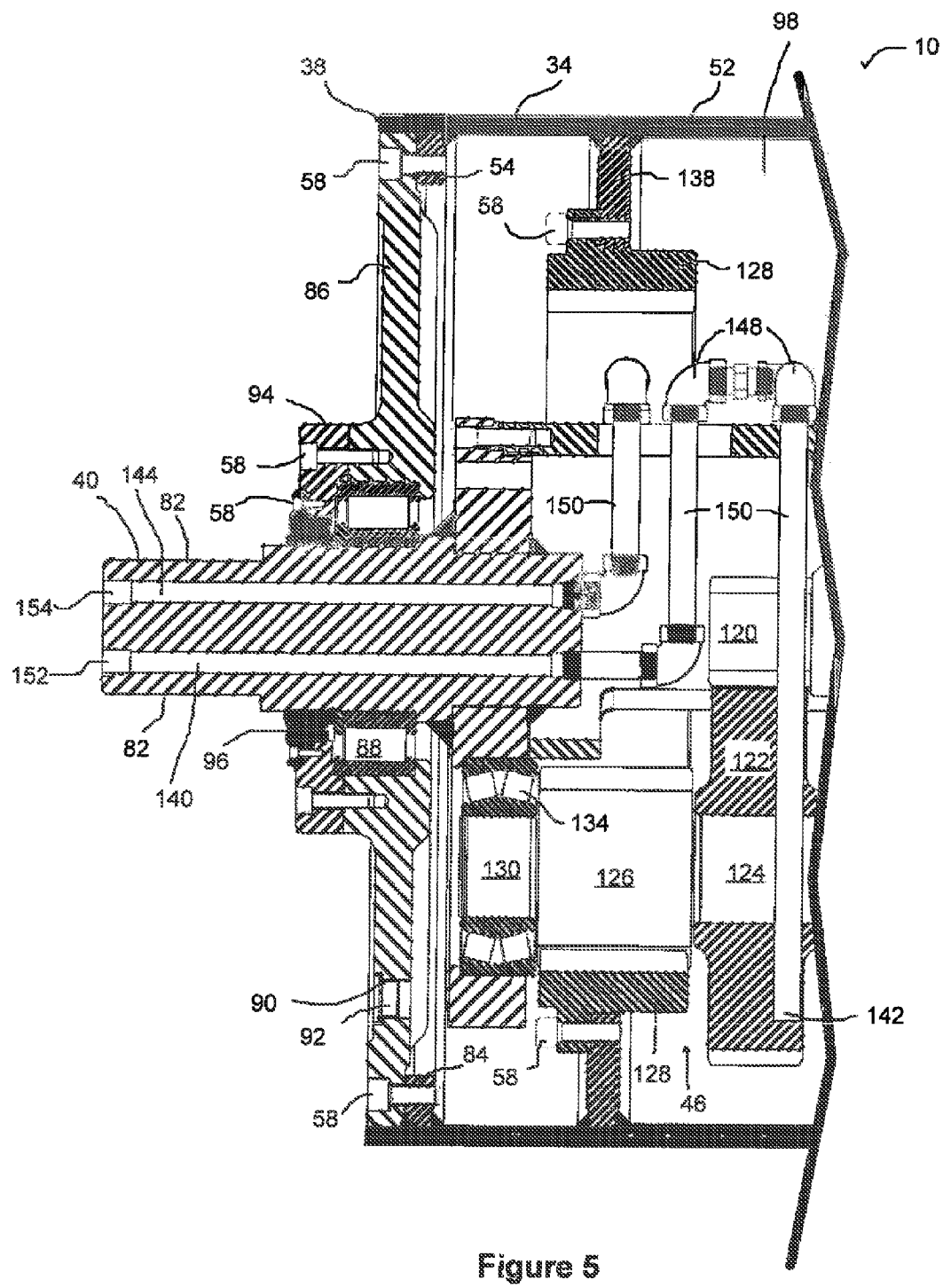
FIG. 5 is a partial view of a cross-section of a portion of the conveyor drive roller of FIG. 1 showing the oil removal flow path connected to the oil removal conduit and the oil return flow path connected to the oil return conduit.
Figure 6:
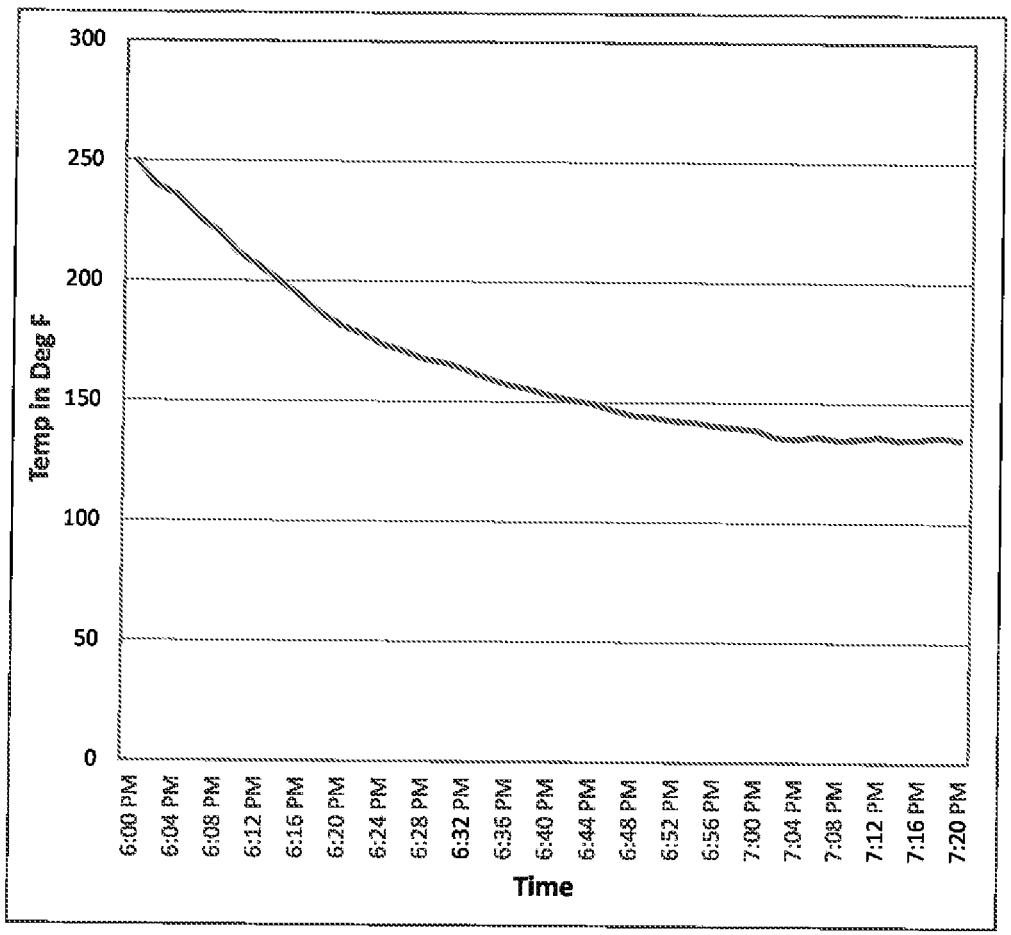

The conveyor drive roller 10 was placed in an oven set to 346° F. (174° C.). About 50 gallons of EP220 synthetic oil was brought to a temperature of 250° F. (121° C.) in 6.5 hours. The cooling means 20 was positioned in a room outside of the oven which was at a temperature of 23° C. Once the oil 66 inside of the conveyor drive roller 10 reached a temperature of 250° F. (121° C.), the oil cooling means 20 was turned on. In this test, the oil cooling means 20 was turned on at 6:00 pm. The results are shown in FIG. 5, which contains a chart showing a gradual decrease in the oil temperature from 250° F. (121° C.), stabilizing at 130° F. (54° C.) to 134° F. (57° C.) after 60 minutes.

The conclusion drawn from these test results was that a 200 horsepower conveyor drive roller operatively connected to a cooling means 20 according to an embodiment of the present invention will not exceed 60° C. (140° F.) in a fully loaded or even overloaded condition.

A subsequent test was conducted with the conveyor drive roller rigged to a conveyor system and tested in a fully loaded condition, which showed good results in a real world environment.

In use, conveyor drive roller 10 is mounted to a frame 12 by stationary shafts 40, 42, in a manner which prevents the stationary shafts 40, 42 from rotating. When energized by operation of a suitable start switch (not shown) motor 44, spins rotor 110, which has at its end a pinion 120 which meshes with intermediate gear 122, causing the second pinion 126 to rotate. In turn, second pinion 126 meshes with ring gear 128 which causes the cylindrical drum 34 to rotate about stationary shafts 40, 42, since the ring gear 128 is secured to the inside of the cylindrical drum 34 via securing ring 138. Rotation of cylindrical drum 34 in turn causes movement of the conveyor medium 18 carried on cylindrical drum 34, which will move any product on the conveyor medium 18 along its desired path.

Heat generated by friction acting on the moving parts of the gear assembly 46, and by the current flowing through the electric motor windings of the motor 44 is absorbed by the oil 66. Pump 26 of oil cooling means 20 sucks the heated oil 66 from inside the compartment 98 of the conveyor drive roller 10 via oil removal line 30 and moves the heated oil 66 through heat exchanger or radiator 22 which is cooled by fan unit 24. The cooled oil 66 from the radiator 22 returns to the compartment 98 of the conveyor drive roller 10 via oil return line 32. Preferably, the oil 66 is continuously circulated in this fashion while the conveyor drive roller 10 is being operated in order to control the heat generated by the conveyor drive roller 10 and prevent the oil 66 and the conveyor drive roller 10 from overheating past a critical temperature.

Preferably, the temperature of the oil 66 inside the compartment 98 of the conveyor drive roller 10 will be controlled with the oil cooling means 20 so that it does not exceed a critical temperature, such as for example a temperature at which conventional lubricating oils degrade, or lose their rated viscosity, or components of the conveyor drive roller 10 fail, causing damage to the conveyor drive roller 10. Preferably, the temperature of the oil 66 inside the compartment 98 of the conveyor drive roller 10 will not exceed 90° C., more preferably the temperature of the oil 66 inside the compartment 98 will not exceed 80° C., and most preferably the temperature of the oil 66 inside the compartment 98 will not exceed 70° C. As mentioned above, a thermostat device may be operatively connected to the conveyor drive roller 10 to turn the oil cooling means 20 on and off as required to maintain a predetermined oil temperature of the oil 66 inside the conveyor drive roller 10.

Furthermore, controlling the temperature of the oil 66 inside the compartment 98 of the conveyor drive roller 10 according to the present invention, may be used to make conveyor drive rollers in sizes which are physically smaller than required to avoid overheating (i.e. exceeding a critical temperature of the conveyor drive roller 10) due to inadequate intrinsic heat dissipation during continuous operation of the conveyor drive roller 10. In other words, the conveyor drive roller 10 may be made smaller than required to dissipate heat through conductive, convective and radiative heat loss via, for example the surface area and mass of the conveyor drive roller itself, yet which can be operated continuously without being susceptible to overheating and the resulting damage such overheating can cause if left unchecked. For example, a 200 hp conveyor drive roller 10 having an internal gear assembly 46, motor 44, and oil cooling means 20 according to the present invention which is configured to operate at full rated power without overheating, can be sized and shaped to provide a volume of 52,000 inch$^3$. In contrast, it is estimated that a conventional conveyor drive roller which is not configured with the oil cooling means 20 would need to be sized and shaped to provide a volume of at least 75,000 inch$^3$ in order to prevent overheating. Accordingly, a conveyor drive roller 10 according to the present invention may be made at least 20% to 30% smaller than a conventional conveyor drive roller which is not configured for operation with the oil cooling means 20. It will now be appreciated that the smallest physical size of a conventional conveyor drive roller is limited to a size that provides sufficient surface area and mass to achieve enough intrinsic heat dissipation to prevent overheating, whereas the size of a conveyor drive roller 10 according to the present invention is not limited by requirements for surface area or mass because additional heat dissipation is provided with the oil cooling means 20.

Based on these same principles, the conveyor drive roller 10 operatively connected to the oil cooling means 20 according to the present invention can be provided with a higher horsepower motor as compared to a conventional conveyor drive roller which is the same physical size but which is not configured for operation with the cooling means 20.

Accordingly, it will now be understood that a person skilled in the art when making or designing a conveyor drive roller 10 according to the present invention may, for example, size the hollow drum 34 to suit the space requirements in a particular application. With all the other parts of the conveyor drive roller 10 in place, the person skilled in the art may estimate the heat generation rate and heat rejection rate of the conveyor drive roller 10.

If the estimated heat generation rate is greater than the estimated heat rejection rate, the person skilled in the art may select a means for cooling 20 which has a heat rejection rate equal to or greater than the difference between the estimated heat generation rate and the estimated heat rejection rate of the conveyor drive roller 10, and operatively connect it to the first and/or second stationary shafts 40, 42 which are configured to permit circulation of the oil 66 inside of the hollow drum 34 through the oil cooling means 20.

Alternatively, or additionally, according to another embodiment of the present invention, the person skilled in the art may use a thermostat device operatively connected to the conveyor drive roller 10 to measure the temperature of the oil 66 inside of the hollow drum 34 and turn the oil cooling means 20 on and off in response to changes in temperature of the oil 66 inside of the hollow drum 34. Thus, according to this embodiment, temperature of the oil 66 inside of the hollow drum 34 is regulated by the cycling of the oil cooling means 20 on and off by the thermostat.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A conveyor drive roller for moving a conveyor medium, said conveyor drive roller comprising:
   a hollow drum rotatably connected to a first stationary shaft and a second stationary shaft;
   an internal gear assembly disposed inside said hollow drum, and operatively connected to said hollow drum, said internal gear assembly being configured to operatively couple to a motor, wherein when said motor is coupled to said internal gear assembly, operation of said motor causes rotation of said hollow drum about said first and second stationary shafts;
   a first liquid lubricant, flow path passing from inside said hollow drum to outside said hollow drum through said first or second stationary shaft, said first liquid lubricant flow path being configured to permit a liquid lubricant be moved from inside said hollow drum to outside said hollow drum; and a second liquid lubricant flow path passing from outside said hollow drum to inside said hollow drum through said first or second stationary shaft, said second liquid lubricant flow path being configured to permit said liquid lubricant be moved from outside said hollow drum to inside said hollow drum; and wherein said first and second liquid lubricant flow paths are configured to connect to a liquid lubricant cooler positioned outside of said hollow drum.

2. The conveyor drive as claimed in claim 1, wherein both said first and second liquid lubricant flow paths pass through the same first or second stationary shaft.

3. The conveyor drive as claimed in claim 1, wherein said first liquid lubricant flow path passes through of one of said first stationary shaft and said second stationary shaft, and said second liquid, lubricant flow path passes through the other of said first stationary shaft and said second stationary shaft.

4. The conveyor drive roller as claimed in claim 1, wherein said hollow drum further comprises said liquid lubricant.

5. The conveyor drive roller as claimed in claim 1, wherein said liquid lubricant is an oil.

6. The conveyor drive roller as claimed in claim 5, wherein said oil is EP220, or an industrial enclosed gear box lubricant.

7. The conveyor drive roller as claimed in claim 1, wherein said motor is an electric motor positioned inside or outside of said hollow drum.

8. The conveyor drive roller as claimed claim 1, wherein said first liquid lubricant flow path comprises an inlet inside said hollow drum, said inlet being positioned below a level of said liquid lubricant.

9. The conveyor drive roller as claimed claim 8, wherein said inlet is positioned toward a bottom of said hollow drum.

10. The conveyor drive as claimed in 1, wherein said second lubricant flow path comprises an outlet inside said hollow drum, said outlet being positioned to discharge liquid lubricant onto at least a portion of said internal gear assembly.

11. The conveyor drive roller as claimed in claim 1, wherein said first liquid lubricant flow path comprises an outlet positioned outside said hollow drum on said first or second stationary shaft, and wherein said second liquid lubricant flow path comprises an inlet positioned outside said hollow drum on said first or second stationary shaft.

12. The conveyor drive roller as claimed in claim 11, further comprising said liquid lubricant cooler operatively connected to said first and second liquid lubricant flow paths, wherein said liquid lubricant cooler comprises:

a circulation pathway for said liquid lubricant, said circulation pathway being connected to said outlet of said first liquid lubricant flow path and said inlet of said second liquid lubricant flow path;

a pump positioned on said circulation pathway to move said liquid lubricant through said circulation pathway; and a heat exchanger positioned on said circulation pathway to cool said liquid lubricant as it moves through said heat exchanger.

13. The conveyor drive roller as claimed in claim 12, wherein said heat exchanger is an air-to-liquid heat exchanger, and said liquid lubricant cooler further comprises a fan to move air through said air-to-liquid heat exchanger.

14. The conveyor drive roller as claimed in claim 1, wherein said liquid lubricant cooler is capable of cooling said liquid lubricant to below a critical temperature.

15. The conveyor drive roller as claimed in claim 14, wherein said critical temperature is a temperature at which said liquid lubricant degrades or components of said conveyor drive roller fail.

16. The conveyor drive roller as claimed in claim 12, wherein said liquid lubricant cooler is sized and configured to maintain said liquid lubricant inside said hollow drum at a temperature less than or equal to 90° C.

17. The conveyor drive roller as claimed in claim 12, wherein said liquid lubricant cooler is sized and configured to provide a heat rejection rate equal to or greater than a heat generation rate of the conveyor drive roller.

18. The conveyor drive roller as claimed in claim 12, wherein said liquid lubricant cooler is sized and configured to provide a heat rejection rate equal to or greater than the difference between a heat generation rate of the conveyor drive roller and a heat rejection rate of the conveyor drive roller.

19. The conveyor drive roller as claimed in claim 1, further comprising a means for measuring a temperature of the liquid lubricant inside of said hollow drum and turning the liquid lubricant cooler on and off in response to changes in said temperature of the liquid lubricant inside of said hollow drum.

20. A method of cooling a conveyor drive roller having a) a hollow drum rotatably connected to a first stationary shaft and a second stationary shaft, b) a liquid lubricant disposed inside said hollow drum, and c) an internal gear assembly disposed inside said hollow drum, and operatively connected to said hollow drum, said internal gear assembly being configured to operatively couple to a motor, wherein when said motor is coupled to said internal gear assembly operation of said motor causes rotation of said hollow drum about said first and second stationary shafts, said method comprising the step of:

circulating said liquid lubricant inside of said hollow drum through a liquid lubricant cooler positioned outside of said hollow drum.

21. The method as claimed in claim 20, wherein said circulating step comprises:

removing a portion of said liquid lubricant from inside said hollow drum to outside said hollow drum through said first or second stationary shaft via a first liquid lubricant flow path;

cooling said portion of said liquid lubricant removed from inside said hollow drum;

returning said portion of said cooled liquid lubricant from outside said hollow drum to inside said hollow drum through said first or second stationary shaft via a second liquid lubricant flow path.

22. The method as claimed in claim 21, wherein said liquid lubricant cooler comprises:

a circulation pathway connected to said first liquid lubricant flow path and said second liquid lubricant flow path;

a pump positioned on said circulation pathway to move said liquid lubricant through said circulation pathway; and a heat exchanger positioned on said circulation pathway to cool said liquid lubricant as it moves through said heat exchanger.

23. The method as claimed in claim 22, wherein said heat exchanger is an air-to-liquid heat exchanger, and said liquid lubricant cooler further comprises a fan to move air through said air-to-liquid heat exchanger.

24. The method as claimed in claim 22, wherein said lubricant cooler is capable of cooling said liquid lubricant circulated therethrough to maintain said liquid lubricant inside of said hollow drum below a critical temperature.

25. The method as claimed in claim 24, wherein said critical temperature is temperature at which said liquid lubricant degrades or components of said conveyor drive roller fail.

26. The method as claimed in claim 25, wherein said liquid lubricant cooler is sized and configured to maintain said liquid lubricant inside said hollow drum at a temperature less than or equal to 90° C.

27. The method as claimed in claim 22, wherein said liquid lubricant cooler is sized and configured to provide a heat rejection rate equal to or greater than a heat generation rate of the conveyor drive roller.

28. The method as claimed in claim 22, wherein said liquid lubricant cooler is sized and configured to provide a heat rejection rate equal to or greater than the difference between a heat generation rate of the conveyor drive roller and a heat rejection rate of the conveyor drive roller.

29. The method as claimed in claim 22, further comprising measuring said temperature of the liquid lubricant inside of said hollow drum and turning the liquid lubricant cooler on and off in response to changes in temperature of the liquid lubricant inside of said hollow drum.

30. The method as claimed in claim 22, wherein said motor is an electric motor positioned inside or outside of said hollow drum.

31. A method of making a conveyor drive roller in a size smaller than required to avoid overheating by intrinsic heat dissipation during continuous operation of said conveyor drive roller, the method comprising the steps of:
    forming a hollow drum with said smaller size and rotatably connecting said hollow drum to a first stationary shaft and a second stationary shaft, with an internal gear assembly disposed inside of said hollow drum and operatively connected to said hollow drum, said hollow drum being configured to hold a liquid lubricant in contact with said internal gear assembly, said internal gear assembly being configured to operatively couple to a motor, wherein when said motor is coupled to said internal gear assembly operation of said motor causes rotation of said hollow drum about said first and second stationary shafts; and
    configuring said first and/or second stationary shaft to permit circulation of said liquid lubricant inside of said hollow drum through a liquid lubricant cooler, wherein said liquid lubricant cooler is capable of cooling said liquid lubricant circulated therethrough to maintain a temperature of the liquid lubricant inside of said hollow drum below a critical temperature.

32. The method as claimed in claim 31, further comprising operatively connecting said liquid lubricant cooler to said configured first and/or second stationary shaft.

33. The method as claimed in claim 32, further comprising measuring said temperature of the liquid lubricant inside of said hollow drum and turning the liquid lubricant cooler on and off in response to changes in said temperature of the liquid lubricant inside of said hollow drum.

34. The method as claimed in claim 31, wherein said critical temperature is temperature at which said liquid lubricant degrades or components of said conveyor drive roller fail.

35. The method as claimed in claim 34, wherein said liquid lubricant cooler is sized and configured to maintain said liquid lubricant inside said hollow drum at a temperature of less than or equal to 90° C.

36. The method as claimed in claim 31, further comprising the steps of:
    estimating a heat generation rate of the conveyor drive roller; and
    selecting said liquid lubricant cooler to have a heat rejection rate equal to or greater than said estimated heat generation rate of the conveyor drive roller.

37. The method as claimed in claim 31, further comprising the steps of:
    estimating a heat generation rate of the conveyor drive roller;
    estimating a heat rejection rate of the conveyor drive roller; and
    selecting said liquid lubricant cooler to have a heat rejection rate equal to or greater than the difference between said estimated heat generation rate of the conveyor drive roller and said estimated heat rejection rate of the conveyor drive roller.

38. The method as claimed in claim 31, wherein said configuring said first and/or second stationary shaft step comprises:
    forming a first liquid lubricant flow path in said first or second stationary shafts for removing a portion of said liquid lubricant from inside said hollow drum;
    forming a second liquid lubricant flow path in said first or second stationary shaft for returning said portion of said liquid lubricant to inside of said hollow drum.

39. The method as claimed in claim 38, wherein said liquid lubricant cooler comprises:
    a circulation pathway connected to said first liquid lubricant flow path and said second liquid lubricant flow path;
    a pump positioned on said circulation pathway to move said liquid lubricant through said circulation pathway; and
    a heat exchanger positioned on said circulation pathway to cool said liquid lubricant as it moves through said heat exchanger.

40. The method as claimed in claim 38, wherein said heat exchanger is an air-to-liquid heat exchanger, and said liquid lubricant cooler further comprises a fan to move air through said air-to-liquid heat exchanger.

41. The method as claimed in claim 31, wherein said motor is an electric motor positioned inside or outside of said hollow drum.

42. The method as claimed in claim 31, wherein said hollow drum is at least 20% smaller by volume than required to avoid overheating by intrinsic heat dissipation during continuous operation of said conveyor drive roller without the liquid lubricant cooler.

* * * * *